United States Patent

Bogan

[15] 3,653,364
[45] Apr. 4, 1972

[54] COMBUSTION CONTROLLING ANTI-POLLUTION DEVICE

[72] Inventor: Simeon Bogan, Wilkes-Barre, Pa.

[73] Assignee: Elizabeth P. Mensch, Dallas, Pa. a part interest

[22] Filed: Oct. 27, 1970

[21] Appl. No.: 84,421

[52] U.S. Cl. ..................... 123/3, 23/212, 123/119 E
[51] Int. Cl. ..................... F02b 43/08, C01b 1/08
[58] Field of Search ............. 123/3, 119 E; 23/212 R

[56] References Cited

UNITED STATES PATENTS

| | | | |
|---|---|---|---|
| 1,345,905 | 7/1920 | Abbott | 23/212 R |
| 1,403,189 | 1/1922 | Palmer | 23/212 R |
| 2,699,986 | 1/1955 | Buell et al. | 23/212 R |
| 3,027,238 | 3/1962 | Watkins | 23/212 R |
| 3,074,390 | 1/1963 | O'Laughlin | 123/119 E |
| 3,311,097 | 3/1967 | Mittelstaedt | 123/119 E |
| 3,572,297 | 3/1971 | Murray | 123/119 E |

Primary Examiner—Wendell E. Burns
Attorney—Clarence A. O'Brien and Harvey B. Jacobson

[57] ABSTRACT

A device for producing hydrogen gas and introducing it into the intake manifold of an internal combustion engine with the device being in the form of a container having iron balls therein heated by an exhaust pipe from the engine, and electrically energized heating device with the container being in communication with a steam producing device whereby water vapor passing over the heated iron balls will cause oxidation of the iron balls and production of hydrogen gas.

6 Claims, 4 Drawing Figures

Simeon Bogan
INVENTOR.

BY Clarence A. O'Brien
and Harvey B. Jacobson
Attorneys

Simeon Bogan
INVENTOR

BY Clarence A. O'Brien
and Harvey B. Jacobson
Attorneys

COMBUSTION CONTROLLING ANTI-POLLUTION DEVICE

BACKGROUND OF THE INVENTION

Field of the Invention

The present invention generally relates to an anti-pollution device associated with an internal combustion engine which utilizes the heat from the exhaust pipe of the engine for producing a hydrogen gas which is introduced into the intake manifold of the engine with the device also including an electric heating device and a vapor producing device for introducing water vapor into a container having a quantity of heated iron balls disposed therein.

BACKGROUND OF THE INVENTION

Many previous efforts have been made to enable operation of an internal combustion engine with reduced emission of unburned hydrocarbons and other air contaminants. One effort to reduce emission of pollutants from internal combustion engines has been directed toward the production of a gas which is more readily burnable than the usual combustible mixture and the introduction of this gas into the engine. U.S. Pat. No. 1,490,975 discloses one type of device for producing free hydrogen for introduction into the engine. This patent employs an acid-saturated vapor passing in contact with zinc or other metal which will chemically combine with the acid to produce hydrogen. U.S. Pat. No. 1,966,345 also discloses a device for generating hydrogen in which water vapor is conveyed past iron filings so that the oxygen from the steam will combine with the iron to form iron oxide thus liberating hydrogen from the steam which is introduced into the intake manifold. Such previously known devices introduce many problems which are extremely difficult to solve. For example, acid vapors are quite corrosive and in the event of the supply of zinc becoming exhausted, the acid vapors would be quite harmful to the engine components. Also, where only exhaust heat is utilized the production of hydrogen gas is inadequate under some operating conditions, especially during the initial period of operation of an engine when the discharge of pollutants is at the maximum.

SUMMARY OF THE INVENTION

It is an object of the present invention to provide an anti-pollution device in the form of a container having a plurality of iron balls therein and an electric heating device and also heat exchange relation to the exhaust pipe so that the iron filings and consequently the steam vapor introduced into the container may be heated by the electric heater and the heat from the exhaust pipe thus assuring a supply of hydrogen gas to the intake manifold even though the heat produced by the exhaust pipe is inadequate for this purpose.

A further object of the invention is to provide an anti-pollution device which is accurately controlled and provided with safe guards to assure that the engine will operate properly with the device being constructed in such a manner that the engine will continue to operate in the event the anti-pollution device becomes inoperative and to maintain safe conditions at all times.

Still another important object of the invention is to provide an anti-pollution device which is simple to install and operate, safe, effective for producing hydrogen gas and relatively inexpensive to manufacturer and maintain.

DESCRIPTION OF THE PREFERRED EMBODIMENT

Figure 1:
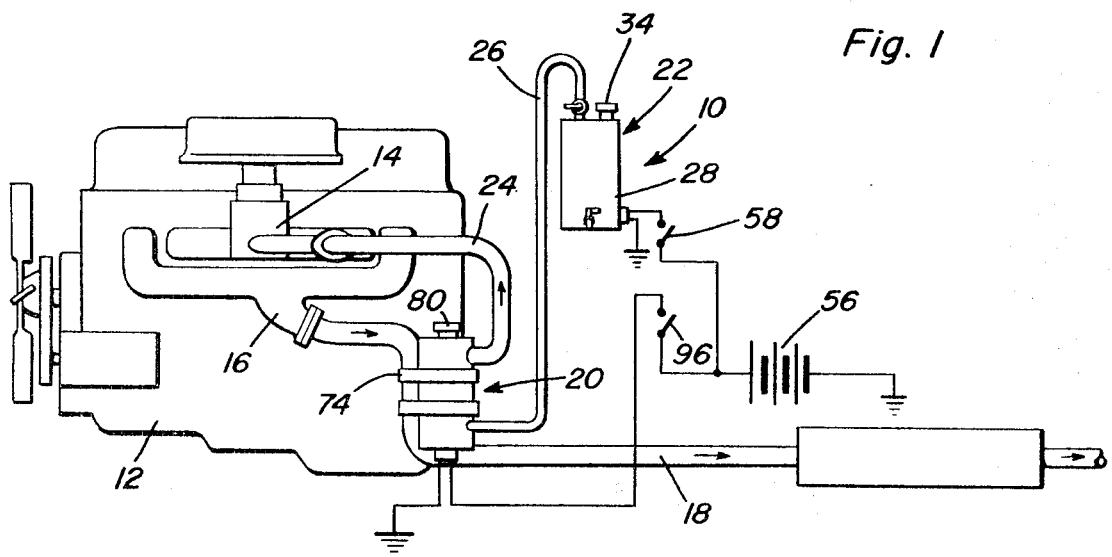
FIG. 1 is a schematic view of the anti-pollution device of the present invention associated with an internal combustion engine.

Referring specifically to FIG. 1, the anti-pollution device of the present invention is generally designated by the numeral 10 and is illustrated schematically in association with an internal combustion engine 12 having the usual intake manifold or system 14 and an exhaust manifold 16 communicated with an exhaust pipe 18 in a well known manner. The anti-pollution device 10 includes a hydrogen gas producing unit generally designated by the numeral 20 and a steam or water vapor producing unit 22. The hydrogen gas producing unit 20 is communicated with the intake manifold 14 through a suitable pipe or conduit 24 communicating with the upper end of the hydrogen gas producing unit 20. The steam producing unit 22 is communicated with the hydrogen producing unit 20 through a pipe or conduit 26 which communicates the top of the steam producing unit 22 with the bottom portion of the hydrogen producing unit 20.

Figure 4:
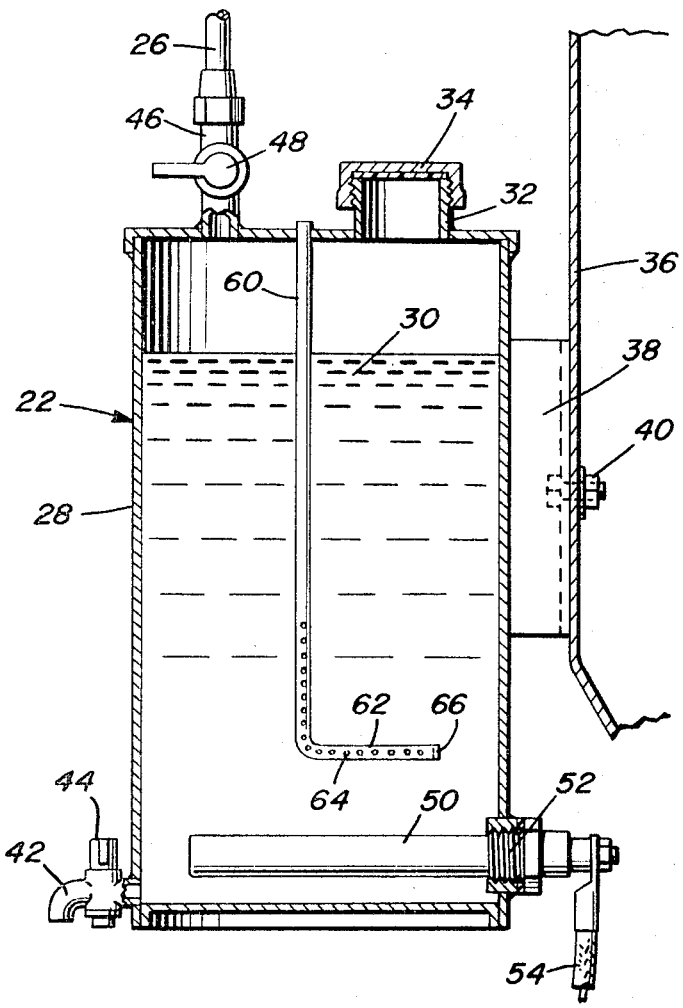
FIG. 4 is a vertical sectional view of the vapor producing device.

Referring to FIG. 4, the specific details of the steam or water vapor producing unit 22 are illustrated and includes a vertically disposed tank 28 for receiving a quantity of water 30. The upper end of the tank 28 is provided with a filler neck 32 provided with a screw threaded closure cap 34 provided with a suitable gasket or the like. The tank 28 is supported from a suitable support such as the fire wall 36 of an automotive vehicle or the like by the use of a suitable bracket 38 and fastening bolts 40 or the like. The bottom of the tank 28 is provided with a drain pipe 42 having a manual valve assembly 44 therein for draining water from the tank 30 to enable any sediment collected in the bottom of the tank 28 to be drained therefrom. The top of the tank 28 is also provided with a discharge fitting 46 to which the pipe, conduit or hose 26 is attached with the fitting 46 also having a manually operated valve 48 therein for selectively communicating the upper end of the container 28 with the hydrogen gas producing unit 20.

Disposed in the bottom of the tank 28 is a heating unit 50 which is replaceable with a screw threaded mounting assembly 52. The heating unit 50 is connected to a conductor 54 electrically connected with the vehicle storage battery 56 through a suitable switch 58 so that when the switch is closed and the battery 56 is charged, the electrical heating unit 50 will heat the water 30 thus producing steam or water vapor. Also, the top of the tank 18 has a small air tube 60 associated therewith which has the upper end thereof disposed above the tank and open to the atmosphere. The lower end of the tube 60 extends to a point adjacent the bottom of the tank and terminates in a laterally extending lower end 62 having a plurality of small openings 64 therein which extend along the horizontal portion 62 and upwardly along a substantial portion of the vertical portion of the tube 60. The air tube 60 enables air to be introduced into the tank 28 so that the engine 12 can draw water vapor into the hydrogen producing unit 20 by the vacuum produced in the intake manifold. Thus, air will be pulled down through the tube 60 and out through the small orifices or apertures 64 with the air thus passing up through the water 30 and entraining moisture or water vapor therein as the air passes through the conduit 26 into the hydrogen gas producing unit 20. The lower end of the tube 60 is closed as at 66 to assure movement of air downthrough the tube 60 during operation of the engine which will eliminate the production of a vacuum within the tank 28 and also serve as a relief for the tank 28 in the event the heater 50 is left on when there is no demand for the steam or water vapor.

Figure 2:
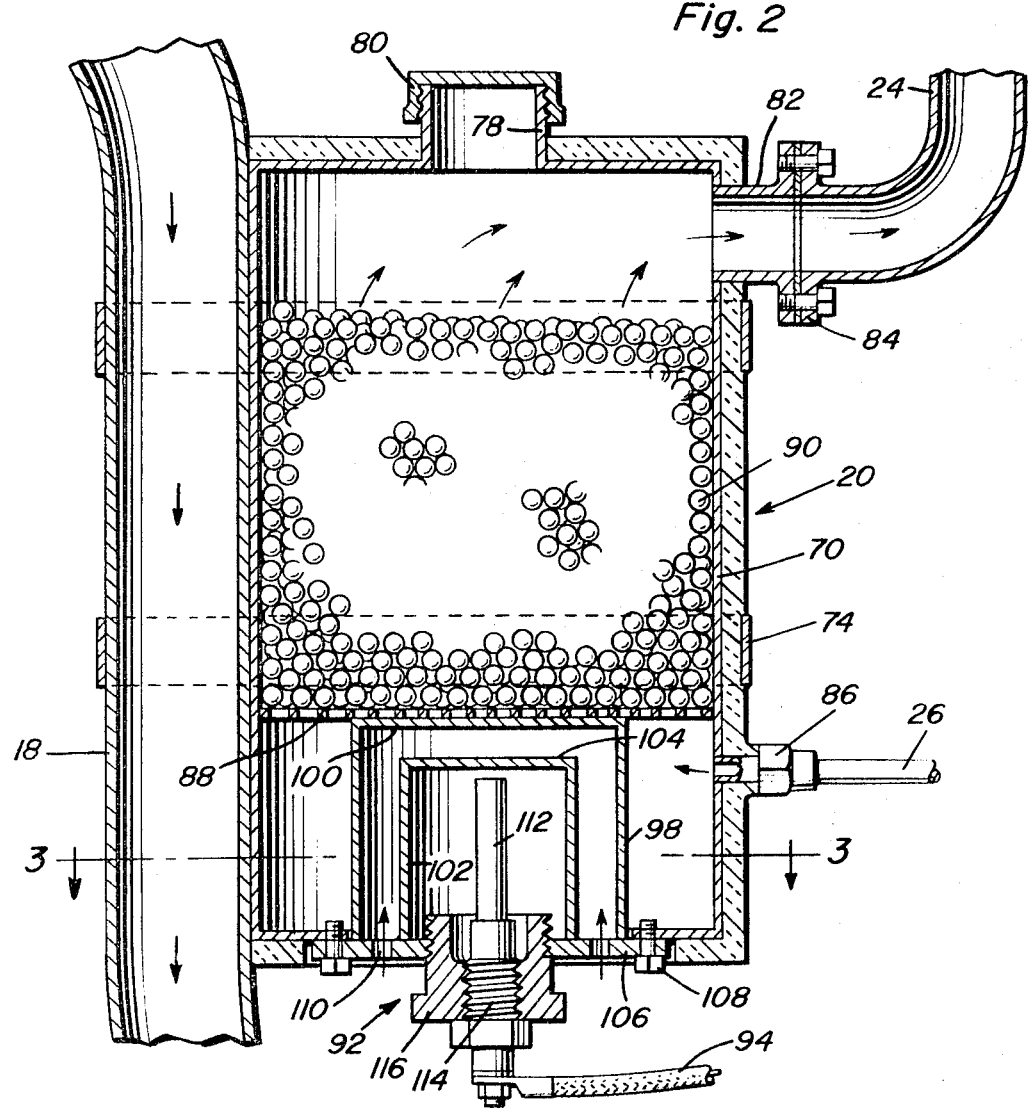
FIG. 2 is a vertical sectional view of the hydrogen producing device illustrating the heat exchange mounting on the exhaust pipe and the structural details thereof.
Figure 3:
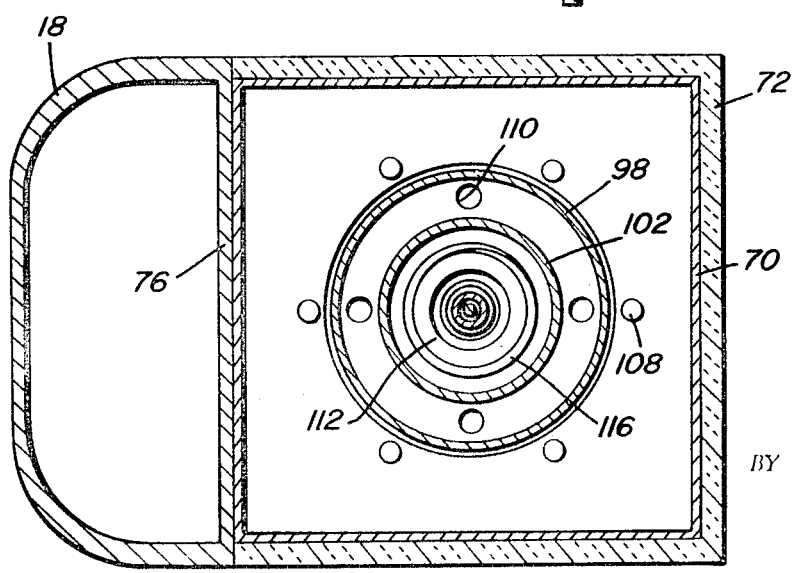
FIG. 3 is a transverse, plan sectional view taken substantially upon a plane passing along section line 3—3 of FIG. 2 illustrating the structural details of the heating device.

FIGS. 2 and 3 illustrate the details of the hydrogen gas producing unit 20 which includes the vertically disposed tank 70 provided with an exterior insulating layer 72 around three sides thereof. The tank 70 is mounted in heat exchange relation to the exhaust pipe 18 by clamp bands 74. As illustrated in FIG. 3, the exhaust pipe has a flat side 76 in engagement with the flat side wall of the tank 70 to produce a good heat exchange relation between the tank 70 and the exhaust pipe 18. The top of the tank 70 is provided with a filler neck 78 having a removable screw threaded closure cap 80 forming a closure therefor. The upper side wall of the tank 70 is provided with a tubular fitting 82 to which the pipe 24 is connected by a flange coupling 84 or the like. Adjacent the bottom of the tank 70, an inlet fitting adapter 86 is provided to which the water vapor conduit or hose 26 is communicated for introducing water vapor or steam into the bottom portion of the tank 70.

Disposed above the inlet adapter 86 is a supporting partition 88 in the form of a wire screen or the like on which is supported a plurality of iron balls 90 which substantially fill that area of the tank above the screen 88 so that as steam passes upwardly in the tank 70, it will pass over and around the iron balls. Disposed in the compartment below the partition screen 88 is a heating assembly 92 which is connected through a conductor 94 and a switch 96 to the battery 56 for selectively energizing the electric heating unit.

The electric heating unit 92 includes an outside tubular unit 98 including a top wall 100 adjacent the partition screen 88 and an inside wall 102 also including a top wall 104 with the inside tube or wall 102 being spaced concentrically from the outside tube or wall 98. Both of the tubes or walls 98 and 102 are attached to and supported from a bottom plate 106 that is removably attached to the bottom wall of the tank 70 by fasteners 108 thus enabling the heating unit to be removed and replaced. The plate 106 is provided with a plurality of air holes 110 communicating with the space between the inner and outer tubes 102 and 98 which serve as a safety device. Disposed within the inner tube 102 is the heating unit 112 which has a threaded base portion 114 threaded into an adapter or bushing 116 which is threaded into the plate 106.

The vacuum of the intake manifold causes flow of vapor and gas produced by the hydrogen producing unit 20 to be drawn into the engine. If the outside tube 98 of the heater unit burns out, the vacuum produced by the intake of the engine will draw air through holes 110 and will not draw any vapor. The tube 98 will be constructed of a material less thick than the tube 102 so that it will oxidize first and will burn through first when constructed of iron thus eliminating contact of vapor with the inside tube 102.

In operation, the pipe or conduit 24 is attached to the intake manifold below the carburetor where air and fuel are mixed so that when the hydrogen enters at that point, it is mixed with the fuel and air into substantially a homogeneous mixture so that each cylinder of the engine will receive the same mixture.

When the engine is warmed up to normal temperature, the valve 48 may be actuated. This valve may be actuated from a suitable mechanism extending to a point on the dashboard of the vehicle. Water vapor goes into the hydrogen generating unit 20 where it comes into contact with the hot iron balls 90 which releases hydrogen gas in a well known manner with the hydrogen gas being conveyed to the intake manifold where it is mixed with the fuel and air mixture. The hydrogen gas will provide higher combustion temperatures and produces more complete combustion of the fuel thus reducing the quantity of unburned hydrocarbons which are exhausted into the atmosphere. The device is safe in use in that if a person should remove the cap 80 to refill the device with iron balls while the engine was running or if the engine was not running and the device was turned on during this operation, no harm would occur. If the heating unit 92 burns out, the device will automatically shut off and there will not be any build up of hydrogen gas. The device may run off of exhaust heat only or it may run with the electric heater in operation especially in cold weather. If the device becomes inoperative during use, there will be a noticeable difference in the operation of the engine in which event the valve 48 may be simply turned off until operation of the device has been corrected.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an internal combustion engine including an intake system and an exhaust system, an anti-pollution device comprising a water vapor producing unit, and a hydrogen producing unit having an intake communicated with the water producing unit and a discharge communicated with the intake system of the engine, said hydrogen producing unit including a plurality of iron balls in heat exchange relation to the exhaust system of the engine for heating the balls and producing hydrogen when water vapor passes over the heated balls.

2. The structure as defined in claim 1 wherein said hydrogen producing unit includes an electric heater associated with the balls for raising the temperature thereof.

3. The structure as defined in claim 2 wherein the water vapor producing unit includes an electric heater for producing steam.

4. The structure as defined in claim 3 wherein said electric heater in the hydrogen producing device including concentrically spaced tubular enclosures with the space between the enclosures being vented to the atmosphere to admit air into the hydrogen generating unit when the outer enclosure becomes ruptured.

5. The structure as defined in claim 4 wherein the outer enclosure is constructed of oxidizable iron of thinner construction than the inner enclosure to assure that the outer enclosure will rupture prior to the inner enclosure.

6. The structure as defined in claim 5 wherein said hydrogen producing unit includes a tank having a closure cap thereon for enabling the iron balls to be replaced.

* * * * *